United States Patent
Levitt et al.

(10) Patent No.: US 11,593,804 B2
(45) Date of Patent: Feb. 28, 2023

(54) AUTHENTICATION SYSTEM AND METHOD

(71) Applicant: JPMorgan Chase Bank, N.A., New York, NY (US)

(72) Inventors: Whittney Anne Levitt, New York, NY (US); Nicholas M. Lore, Pearl River, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 378 days.

(21) Appl. No.: 15/467,658

(22) Filed: Mar. 23, 2017

(65) Prior Publication Data

US 2022/0277306 A1 Sep. 1, 2022

Related U.S. Application Data

(60) Provisional application No. 62/312,810, filed on Mar. 24, 2016.

(51) Int. Cl.
*G06Q 20/40* (2012.01)
*G06Q 20/10* (2012.01)
*G06Q 20/32* (2012.01)
*G06Q 20/38* (2012.01)

(52) U.S. Cl.
CPC ..... *G06Q 20/4014* (2013.01); *G06Q 20/1085* (2013.01); *G06Q 20/3278* (2013.01); *G06Q 20/385* (2013.01)

(58) Field of Classification Search
CPC ........... G06Q 20/4014; G06Q 20/1085; G06Q 20/3278; G06Q 20/385
USPC ........................................................ 705/43
See application file for complete search history.

(56) References Cited

U.S. PATENT DOCUMENTS

| | | | |
|---|---|---|---|
| 2012/0144007 A1* | 6/2012 | Choong | H04L 65/1083 709/223 |
| 2012/0240150 A1* | 9/2012 | Low | H04N 21/25816 705/26.35 |
| 2014/0149293 A1* | 5/2014 | Laracey | G06Q 20/3821 705/44 |

(Continued)

FOREIGN PATENT DOCUMENTS

WO WO-2015168641 A1 * 11/2015 ........... G06F 21/335

*Primary Examiner* — Jessica Lemieux
*Assistant Examiner* — Merritt J Hasbrouck
(74) *Attorney, Agent, or Firm* — Greenblum & Bernstein, P.L.C.

(57) ABSTRACT

The invention relates to a computer-implemented system and method for authenticating a customer of a business. The method may include the steps of: receiving from the customer at least one item of identifying information; confirming the identity of the customer; generating a token that represents an active session in which the customer interacts with one or more systems or personnel at the business; conducting a first set of communications between the customer and a first system of the business; inquiring with the customer as to whether the customer desires to transfer the active session to a second system at the business or to a third party system; and transferring the active session using the token to the second system or the third party system. The method may also comprise the steps of retrieving background information on the customer to assist a representative of the business in assisting the customer.

11 Claims, 2 Drawing Sheets

(56) References Cited

U.S. PATENT DOCUMENTS

| | | | |
|---|---|---|---|
| 2014/0258125 A1* | 9/2014 | Gerber | G06Q 20/40 |
| | | | 705/44 |
| 2015/0026049 A1* | 1/2015 | Theurer | G06Q 20/36 |
| | | | 705/41 |
| 2016/0078430 A1* | 3/2016 | Douglas | G06Q 30/0185 |
| | | | 705/43 |
| 2017/0228726 A1* | 8/2017 | Bohanan | G06Q 20/4014 |

* cited by examiner

AUTHENTICATION SYSTEM AND METHOD

CROSS-REFERENCE TO RELATED APPLICATION

This application claims priority to U.S. Provisional Application No. 62/312,810, filed Mar. 24, 2016, which is hereby incorporated by reference.

FIELD OF THE INVENTION

The present invention relates generally to authentication, and more particularly to a method and system for facilitating the authentication of a customer interacting with multiple systems or representatives of a financial institution and/or other business.

BACKGROUND OF THE INVENTION

Often, a customer visiting a bank or other financial institution will need to conduct more than one transaction or make inquiries with different representatives or systems of the financial institution. For example, the customer may initially stop at the automated teller machine (ATM) to withdraw cash, but then may wish to speak with a teller to conduct a different transaction or make an inquiry. The customer may also want to meet with a different bank specialist about the features and benefits of other types of accounts or services offered by the bank. With each interaction, the customer may be required to undergo an authentication process to verify the customer's identity. If the customer conducts multiple transactions or inquiries with different representatives or systems, it may be somewhat irritating to the customer to provide identification, passwords, or other credentials in each instance. Moreover, the customer may perceive that the financial institution does not recognize or value the customer, resulting in diminished customer loyalty. These and other deficiencies exist with known authentication systems and processes.

SUMMARY

According to one embodiment, the invention relates to a computer-implemented system and method for authenticating a customer of a financial institution. The method may include the steps of: receiving from the customer of the financial institution at least one item of identifying information; confirming the identity of the customer based on the at least one item of identifying information; generating a token that represents an active session in which the customer interacts with one or more systems or personnel at the financial institution; conducting a first set of communications between the customer and a first system of the financial institution; inquiring with the customer as to whether the customer desires to transfer the active session to a second system at the financial institution or to a third party system; transferring the active session using the token to the second system or the third party system; and conducting a second set of communications between the customer and the second system of the financial institution or the third party system.

The token representing the active session may be passed to different systems or personnel at the financial institution via different methods, such as by physical swipe (e.g., with a transaction card having a magnetic strip), tap (e.g., near field communication (NFC) transmission), Bluetooth low energy (BLE) transmission through the user's mobile device, or an interface with a mobile app of the financial institution that the user has downloaded onto his or her mobile device. The mobile app may include a user interface that depicts certain devices or personnel at the financial institution or a third party merchant that are available to accept the authentication token.

The method may also comprise the steps of retrieving background information on the customer, such as demographic information, transaction history, personal preferences, balance information, and recent inquiries, and sending the background information to a representative of the financial institution to assist the representative in assisting the customer. If approved by the customer, certain background information such customer preferences or transaction history with a third party merchant may also be sent to the third party merchant.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. The drawings should not be construed as limiting the present inventions, but are intended to be exemplary only.

DETAILED DESCRIPTION

An embodiment of the present invention is directed to a one-time, seamless authentication method and system that facilitates multiple interactions between a customer of a financial institution with various systems and personnel of the financial institution. In addition to providing authentication functionality, the system and method can also enhance the customer's experience by providing relevant, timely information to personnel at the financial institution relating to the customer's accounts, preferences, and recent transactions.

Figure 1:
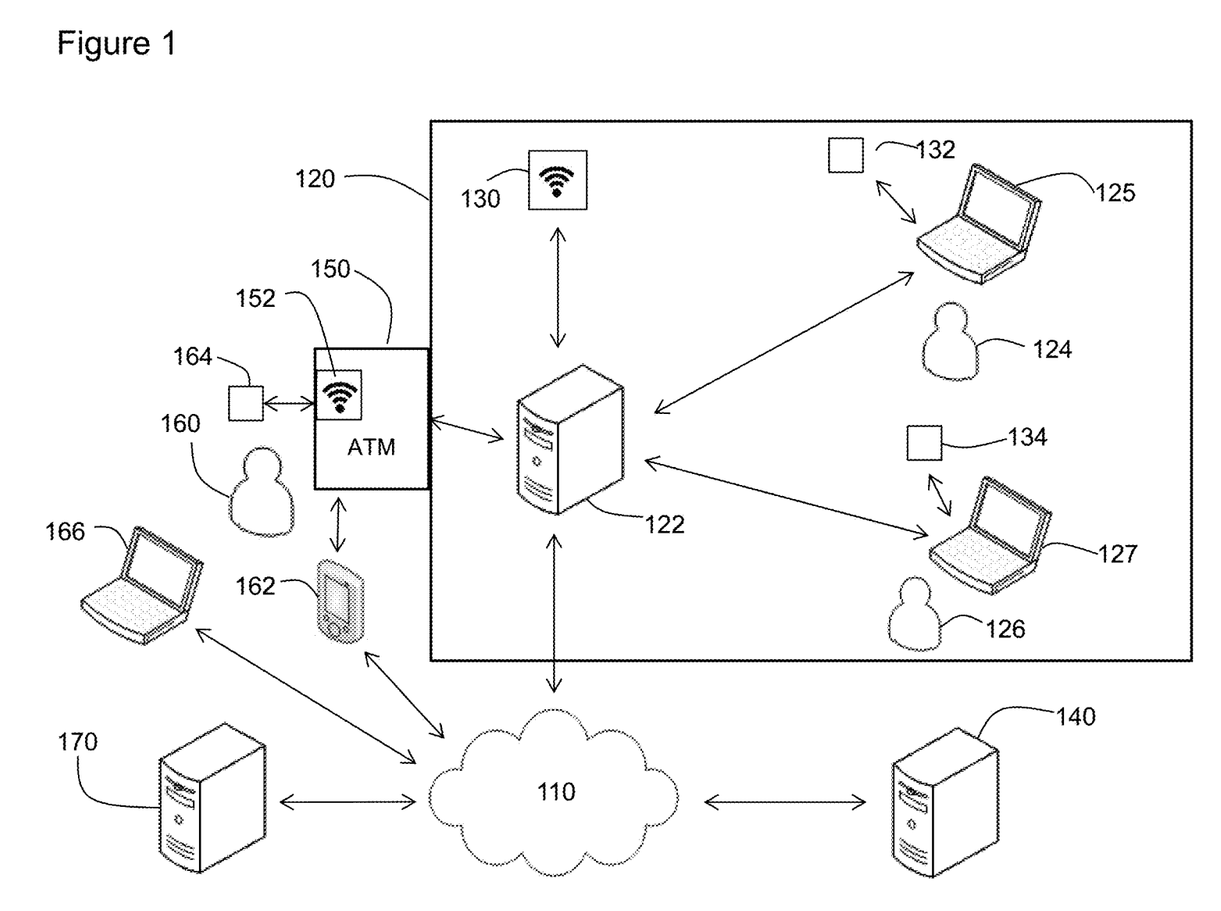
FIG. 1 is a diagram of a system for one-time, seamless authentication according to an exemplary embodiment of the invention.

FIG. 1 depicts one embodiment of the invention that includes a number of systems in a branch bank of a financial institution. As shown in FIG. 1, the branch bank 120 has a branch server 122 housed therein that may store data and programs to provide various banking services and functionality to the bank personnel and bank customers. The branch server 122 may include a database owned and/or operated by the financial institution that interfaces with a number of other servers via one or more networks 110. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The branch server 122 that is used by the financial institution can provide authentication services as well as timely information on the customer to enhance the customer's experience.

The branch server 122 can interface with other systems and servers owned and/or operated by the financial institution. For example the branch server 122 may interface with a central server 140 that stores and processes account data, transaction data, demographic data, customer preferences, and other information relating to customers of the financial institution. The central server 140 and/or branch server 122 can provide the bank branch 120 with access to customer relationship management (CRM) software and data, among other data and resources. The CRM system, for example, may be a third party vendor-provided solution, such as Salesforce.com, or it may be a system owned and operated by the financial institution. The central server 140 may comprise an "on premises" system located behind the firewall of the financial institution, or it may comprise, in whole or in part, a cloud based system and database that the branch server 122 communicates with, e.g., to pull and push data in real time or otherwise as needed. The data may include, for example, CRM data and interactions, as well as authentication information such as a token representing an active session with an authenticated customer. Although FIG. 1 shows one example of a system comprising a branch server 122 and a central server 140, in other embodiments of the invention the central and branch servers may in fact be one server. Those skilled in the art will appreciate that exemplary embodiments of the invention can be implemented with different configurations of computing hardware and services.

The branch server 122 may also interface with an automated teller machine (ATM) 150 installed within or outside of the bank branch 120. The branch server 122 can be used by branch personnel to monitor activities conducted by a customer 160 at the ATM 150.

The branch server 122 may also be connected to various other computing devices used by personnel at the branch bank 120. For example, a bank teller 124 may use his or her desktop computer, laptop computer, tablet computer, or other computing device 125 to conduct transactions or retrieve relevant information for or relating to a customer. An account representative 126 may use his or her computing device 127 to advise a customer on other specialized services and accounts offered by the financial institution and to retrieve information on the customer. The computing devices 125, 127 may interface with the branch server 122 and/or may interface directly with the central server 140 via the network 110, for example. The foregoing description is merely one example of a configuration for such systems and functions and is not intended to be limiting.

When a bank customer 160 visits the bank branch 120, he or she may first stop at the ATM 150, since it is commonly outside the branch 120, near the entrance, or in the lobby of the branch 120. The customer 160 or the customer's mobile phone 162 or wearable device 164 may be detected initially by the ATM 150 or by another device or service owned or operated by the financial institution, such as a beacon or location service functionality. The ATM 150 may include a Bluetooth Low Energy (BLE), beacon, near field communication ("NFC"), WiFi or other radiofrequency or wireless transceiver 152. The branch bank 120 may also one or more BLE, beacon, NFC, and/or Wifi transceivers 130. The transceivers 130 and/or 152 may detect a wireless signal transmitted by the customer's mobile phone or tablet 162, or by the customer's wearable device 164, such as smart watch or other wearable mobile computing device.

According to one embodiment, the customer 160 may have downloaded a software application (commonly referred to as an "app") provided by the financial institution onto his or her tablet or mobile phone 162 or wearable computing device 164. The app on the customer's mobile device 162, 164 may ask the customer 160 whether it is permissible to use the customer's location in connection with the app. If the customer has allowed such use, the app will be able to monitor the customer's location, e.g., with the one or more transceivers 130 and/or the ATM transceiver 152, and alert the systems and personnel of the bank branch 120 that the bank customer 160 is visiting.

As the customer approaches the ATM 150, the ATM, in connection with the branch server 122 and/or central server 140, can authenticate the customer by communicating with the customer's tablet or mobile phone 162 or wearable device 164 and/or requiring the customer 160 to provide additional credentials or information for authentication. For example, the ATM may require the customer to provide and/or receive, via his or her mobile device 162, 164, a verification code via a near field communication (NFC) transmission, a Bluetooth low energy transmission, a wireless transmission, another form of short range transmission, or by swiping or inserting a transaction card having a magnetic strip. Depending on the circumstances, the ATM may be configured to request additional information from the customer, such as a personal identification number (PIN). A PIN may be required, for example, if the customer 160 is visiting a branch 120 for the first time or is visiting a new location. Other information can be requested, if necessary, to achieve a desired level of security, such as biometric information for authentication or requests for additional credentials or information from the customer. The branch bank and ATM can also be equipped with cameras and facial recognition software to incorporate facial recognition as another form of authentication information. In this case, the camera would acquire a digital image of the customer and send it to the branch server 122 or the central server 140, which would then compare the acquired image to a stored image of the customer to determine if it is the same person. The central server 140 and/or branch server 122 use the foregoing information to authenticate the identity of the customer 160.

According to other embodiments of the invention, as the customer 160 approaches the branch 120, he or she may be prompted to open or launch the bank's app via one or more push notifications. The push notifications may include a one-time passcode that the customer 160 can use for his or her authentication at the ATM 150 by providing it to the ATM when prompted, e.g., by entering it manually into the ATM, or by entering it into his or her mobile device 162 or 164 and transmitting it wirelessly to the transceiver 152 of the ATM 150. If the customer 160 does not have the bank's app, they may have registered the mobile device with the bank. Alternatively, the bank may push a message to the customer's mobile phone 162 and related mobile wallets/payment-related applications that may have the bank's card to identify if there is a card of the bank. If there is, the bank can detect who the card belongs by identifying the mobile wallet owner.

According to another embodiment of the invention, if a customer has logged into the bank's app and queued up a transaction within a defined period of time, the system 122/140 can be designed to waive or reduce the requirement for full authentication (e.g., the customer 160 may not need to perform any additional authentication steps) when the customer arrives at the branch 120. The applicable period of time can be defined as a predefined period of time between the initiation of the transaction and arrival at the branch 120, with a predefined time period before and after the predicted arrival time at the branch 120. According to one embodiment, in these circumstances the system 122 may waive or reduce the normally applicable authentication steps, provided that the bank 120 successfully identifies the customer as he or she approaches the bank 120, such as with the transceiver 130 or 152. The ATM 150 and the branch 120, for example, may utilize the camera with facial recognition technology to identify the customer 160, thus relieving the customer 160 from having to provide additional authentication information to the branch 120 in some circumstances.

Once the customer 160 has been authenticated, the branch server 122 or central server 140 may create a token that represents an active session in which the customer interacts with personnel and systems of the branch bank 120. The token may be, for example, a temporary alphanumeric or other code that represents the active session of the authenticated customer. The token may comprise a unique customer ID coupled with keys that represent the day and time of creation, the location of the branch 120, and the customer's mobile device 162, 164. The authentication token can be generated by the local server 122 or the central server 140, for example.

The system may include various security features relating to the authentication token. For example, the system can be programmed to allow the authentication token to remain active as long as the customer 160 remains at the branch location 120, and no other entities are able to detect or track the authentication token. Each session involved can have a unique token, and all data and token/authentication-related information can be encrypted. If the system 122/140 detects that fraud may be present, it has the ability to automatically end or cancel the authentication token. The bank may keep a log in which it records the details of previous authentication token instances and can evaluate and determine whether the current usage of the token constitutes typical behavior or unusual behavior. This behavioral information and previous session tracking information may be presented to the bank's personnel in a real-time dashboard, for example. The dashboard can track live sessions and may identify and depict the different customer devices that are currently active as well as customer devices that previously have been active.

Other security-related features may allow bank customers to determine the level of authentication required for certain transaction and transaction levels. For example, the customer may have the ability to specify, via the bank's online banking website or mobile app, the type of authentication processes required for credit card transactions or withdrawals in specified ranges (e.g., different authentication processes required for transactions less than $250; between $250 and $1,000; or over $1000). The customer may also specify the required frequency of authentication. According to another embodiment of the invention, the system can be programmed to require inclusion of a procedure for automatically transferring personally identifiable information (PII) that is hosted in the cloud to a server on the bank's premises, and to delete such PII stored in the cloud.

Referring again to FIG. 1, the customer 160 may begin his or her business by conducting a desired transaction at the ATM 150, such as a cash withdrawal. According to one embodiment of the invention, as the customer is conducting the ATM transaction, the central server 140 retrieves information on the customer that can enhance the customer's visit to the bank branch 120. The financial institution, for example, may have historical and other information on the customer, such as demographic information, personal and family information, account information, transaction history, personal preferences, loan balance information, approximate income, contact information, recent communications, recent inquiries, etc. Depending on the objectives of the financial institution, certain types of this information may be used to engage the customers to an extent beyond a typical communication with the ATM. For example, if the financial institution is aware that the customer has inquired about different types of checking accounts, such as through website tracking or other recorded communications with the customer, the ATM may be programmed to display a message inviting the customer to meet with a teller to discuss the bank's checking account options. Similarly, if the financial institution is aware that the customer has recently inquired about auto loans or new automobiles, the ATM may be programmed to indicate that an auto loan specialist is available inside to answer any questions. Likewise, if the financial institution is aware that the customer may be looking to refinance their mortgage, the ATM can be programmed to offer a meeting with a mortgage specialist at the branch bank 120.

This information that is relevant to the customer, his or her accounts, transaction history, and/or preferences, for example, may be linked to or associated with the authentication token. The token can be used to tie in other sources of data, such as real-time CRM data, real-time interaction data, and potential offers. The token can also be used to launch the bank's app and bank product-related application usage in which a bank product is present.

Real-time customer transactions and information can be passed with the token as it is transmitted from one bank representative to another. The employee that receives the token therefore can see the transactions or interaction with the previous branch employee or device. Generation of the token may automatically launch a query to the CRM system, which automatically generates relevant customer information for viewing by bank employees for the customer's benefit.

Figure 2:
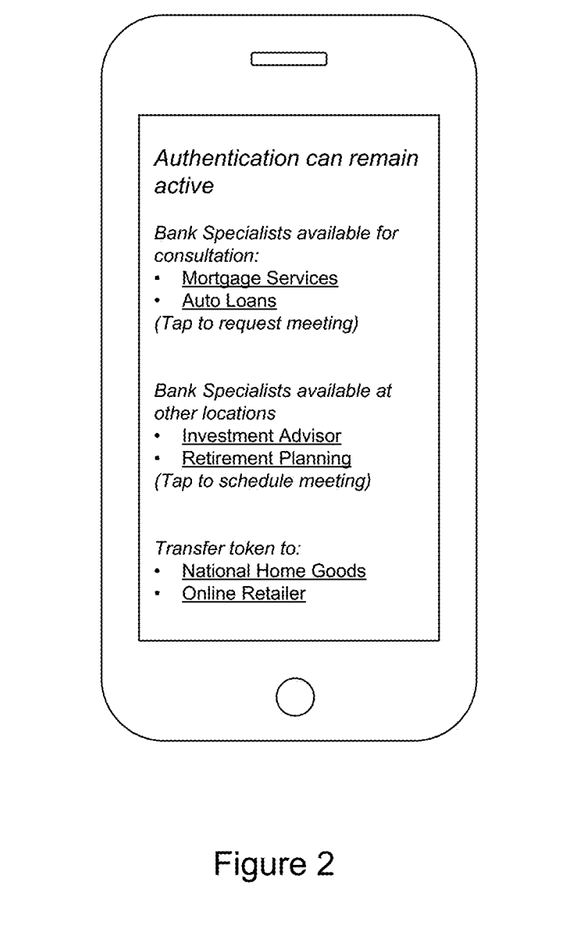
FIG. 2 is an example of a user interface for a customer's mobile device according to an exemplary embodiment of the invention.

At the completion of the ATM transaction, the financial institution may send a push notification to the customer's mobile phone 162 informing the customer that the session can remain active if desired, as shown in FIG. 2. The customer will then have the option to proceed to a teller or other branch representative and to transfer the authenticated session via a tap of the mobile phone (e.g., by NFC transmission) or a push of information to the applicable branch representative via the customer's mobile device 162, or via some other communication process. The financial institution may affect the notification and transfer of the active session by sending a session token to the appropriate representative at the branch 120. For example, the central server 140 or branch server 122 may receive the customer's request to keep the session active and may send the appropriate token to the computing device 125 of a knowledgeable teller 124 or to the computing device 127 of the applicable account specialist 126. The ATM may also be programmed to provide additional information to the customer on the office location, name, title, and other information on the branch representative with whom the customer will meet.

The authentication token can be passed to other branch employees 124, 126 and the customer 160 via a user interface, which may show availability of employees and allows a seamless push of the notification. The token can be passed by tapping, pushing, or other action. FIG. 2 shows an example of the interface, in which the customer is informed that certain bank specialists are available for consultation at the branch. The customer can maintain the active session and transfer the authentication token to another bank employee by simply tapping on a link. The interface identifies resources that are available or unavailable to receive the token. For example, in FIG. 2, the interface shows that specialists in mortgage services and automobile loans are available at the branch 120 to meet with the customer 160. It also shows that specialists in investments and retirement planning are available at other bank locations and invites the customer to schedule an appointment with them. Green and red indicators may be used to indicate which types of specialists are available and unavailable. Tokens can be passed by the customer from one bank representative to another by swiping, clicking on an interface, toggling, or any other suitable process.

Figure 3:
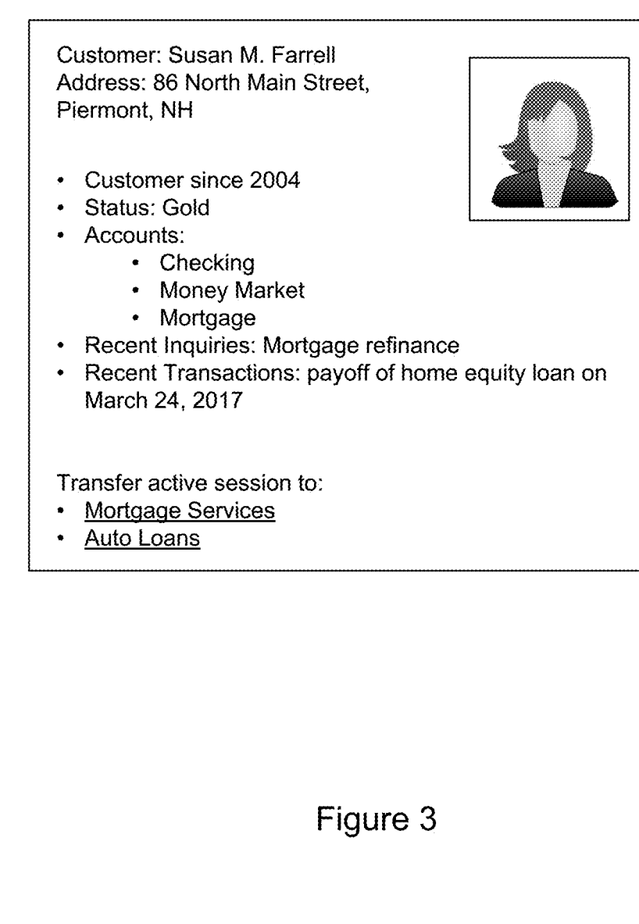
FIG. 3 is an example of a user interface for a bank representative according to an exemplary embodiment of the invention.

The bank teller 124 or other bank representative 126 may also pass the token to the customer 160 via tapping, BLE, NFC, or other transmission method as shown in FIG. 3 ("Transfer active session to:"). The customer 160 can then pass the token to additional branch employees via the same channels or processes.

According to another embodiment of the invention, if the customer calls a service number while in the branch 120 or within a live authentication session, the customer 160 will not need to be re-authenticated because the system 122/140 will recognize the active session and the customer's phone number. The system 122/140 can be programmed to analyze all incoming calls to determine whether the phone number is a customer phone number, and to check in real time whether the customer is in an active session with a live authentication token. In this situation, the service employee receiving the call can also see the real-time transactions or interactions and background information on the customer because that information is linked to the active token.

If the customer so chooses, he or she can proceed directly to the teller 124 or other bank representative 126, for example. According to one embodiment, the teller receives the authentication token prior to the customer's arrival. As shown in FIG. 3, a picture of the customer may be sent to the teller with the token by the central server 140 or the branch server 122 to allow visual confirmation of the customer by the teller. If no picture is available, the teller may verify the customer's identity using a mutual handshake process, such as by signals exchanged between mobile devices, once the customer is in front of the teller. The customer may be authenticated using a transmission from his or her mobile or wearable device 162, 164 such as via NFC, Bluetooth, wireless, or other transmission method. The NFC, BLE, WiFi, or other wireless transmission method may be received by a transceiver 132, 134 of the bank teller 124 or other bank representative 126, as shown in FIG. 1. If the customer 160 does not have a mobile device, then the teller may ask the customer to answer one or more identification questions in order to authenticate the customer. If the teller does not have the authentication token before the customer arrives, then the token will be passed for the first time via NFC, Bluetooth low energy, push, swipe, user interface execution, or other transmission method. There will generally be no need for a second handshape process if the authentication happens for the first time at the teller.

According to one embodiment of the invention, customer information and historic interactions are retrieved from the central server 140 or cloud, once the customer has been authenticated, and transmitted to the bank representative's tablet computer, mobile device, laptop computer, or desktop computer 125, 127, for example. The customer information may include, for example, recent account transactions, recent customer inquiries, demographic information, personal preferences, loan balance information, approximate income, contact information, recent communications, recent website inquiries, and other similar information. Such customer information may be associated with or linked to the token representing the active session, or may be provided concurrently. The token may be linked to or associated with the customer information and all information may be encrypted. The central server 140 or branch server 122 may send a push notification to the applicable bank representative informing him or her that the customer's session remains active and a photograph of the customer along with the customer information that is likely to be helpful to the teller and to the customer. An example of such information is shown in the user interface in FIG. 3. The user interface identifies the customer by name, address, and a photograph. It also provides useful information such as the length of time that the person has been a customer of the bank, the customer status (e.g., silver, gold, platinum), the accounts held by the customer, recent inquiries the customer has made, and recent transactions the customer has executed. This information can provide a number of advantages. For example, it can enhance and expedite the customer's experience because the relevant information has already been pushed to the teller and the customer has already been authenticated. In addition, the information may facilitate the teller's ability to open a new account for, or begin new business with, the customer. Finally, the teller's ability to quickly understand the customer's objectives, recent activities, and background, can convey an impression to the customer that the financial institution values the customer and knows the customer, which results in improved customer loyalty. Since the teller has access to a broad range of information on the customer, the teller can also make a referral to a branch specialist in appropriate circumstances. In this context, the background information on the customer may be most useful, because the teller who has the background information can interact with the customer on a personal level that is more significant than the customer's communications with the ATM.

After the customer has completed the transaction with the teller, if the customer desires to meet with a financial advisor or other account specialist, the teller can initiate a process with his or her computing device 125 to transfer the customer's active session to the device 127 of the financial advisor or account specialist. The customer, for example, may have requested a meeting with a bank employee having certain expertise, such as with mortgages, mutual funds, auto loans, or other specialized products, accounts or services of the financial institution. The central server 140 or branch server 122, upon receiving input from the teller's device 125, can identify the employee or employees 126 at the branch bank 120, or at other locations if necessary, who have the expertise sought by the customer 160. In the example shown in FIG. 3, the user interface provides the opportunity to transfer the active session to an expert on mortgage services or automobile loans, for example. The system may also allow the teller to make a recommendation as to the appropriate bank employee to assist the customer. If the bank employee with the necessary experience is located at the branch 120, the teller's computing device 125 will inform the teller or confirm that such employee is local. The branch server 122 may then utilize a scheduling function to determine whether and when the employee is available to meet with the customer. If the bank employee with the necessary expertise works at another branch, the central server 140 may inform the teller 124 to offer to schedule a phone call or an in-person visit with that employee. Such functionality allows the teller 124 to understand the customer's objectives, questions, and needs, to quickly find the relevant bank personnel who have the necessary experience to assist the customer, to view such personnel's schedule, and to offer to schedule an in-person meeting or phone call between such experienced personnel and the customer. Consequently, the financial institution can enhance the likelihood of starting new business with the customer. And at the least, the process enhances customer loyalty by demonstrating that the financial institution understands the customer and is interested in helping the customer achieve his or her financial objectives.

According to another aspect of the invention, the system can utilize voice-enabled artificial intelligence to process the customer's requests and identify the bank employee with the appropriate experience. As the customer explains the next desired transaction and/or the next set of information he or she needs, the bank employee's intelligent device 125 can analyze the voice information to identify the appropriate employee who can assist with the specific customer objective or transaction. The branch employee's device 125 utilizing voice enabled artificial intelligence can be programmed to automatically send the active session to the appropriately qualified branch employee 126. The teller's device 125 can also be programmed to inform the teller 124 that the customer needs to call or visit a specialist at a different bank location. In such case, the voice activated artificial intelligence system would concurrently identify the appropriate call center specialist to handle the customer's request.

After the customer has concluded his or her last transaction in the active session, the branch server 122 or central server 140 may initiate a push notification to the customer asking the customer if he or she would like to end the session or conduct an additional inquiry or transaction with the financial institution. If the answer is no, then the branch server 122 or central server 140 ends the active session. If the answer is yes, then the branch server 122 or central server 140 repeats the process of identifying the customer's next objective, identifying the bank personnel with appropriate experience and his or her availability, and transferring the active session to that person along with the relevant background information on the customer and his or her accounts, activities, inquiries and objectives.

According to one embodiment, in the event that the customer leaves the current branch location, the financial institution may use beacon or location services or technology (e.g., using transceivers 130) to monitor the location of the customer and automatically end the active session when the customer has left the premises.

According to other embodiments of the invention, the authentication and token generation can be performed by the financial institution for use with third party businesses or organizations. For example, the financial institution may enter into agreements with certain third party merchants to accept the authentication tokens generated by the financial institution. The customer 160 may be authenticated at the branch bank 120, but then the bank 120 may provide the customer with the option to transfer the active token to a third party merchant. The third party merchant may be, for example, a national brick and mortar home products store, or a global online retailer. As shown in FIG. 2, the branch server 122 or the central server 140 may push a message to the customer's mobile device 162, 164 asking the customer 160 if he or she would like to transfer the authentication token to one or more specified third party merchants. If the customer elects to do so, the branch server 122 or central server 140 can transmit the token to a server 170 of the third party merchant, which then does not need to further authenticate the customer 160 based on the agreement between the financial institution and the third party merchant.

According to another example, the customer 160 of the financial institution may initially log on to the website of the financial institution using the customer's personal computer such as a desktop or laptop computer 166. The central server 140 of the financial institution executes the authentication process by asking the customer 160 to provide authentication information such as a username and password. Once the customer has been authenticated, he or she can conduct online transactions with the financial institution. The financial institution may also provide an interface offering the customer 160 the ability to transfer the active authentication token to a third party merchant. If the customer elects to do so, the central server 140 transfers the authentication token to the third party merchant.

According to another embodiment of the invention, the financial institution enters into agreements with one or more third party businesses, such as merchants, to enable customers of the financial institution to visit the website of the third party business and to use their bank credentials (e.g., username and password) to log on to the third party site. In this embodiment, the server 170 of the third party business interfaces with the central server 140 of the financial institution. For example, the central server 140 of the financial institution may initiate a pop up box at the third party merchant server 170 which is used to ask the customer 160 for his or her bank credentials. The username and password are sent to the bank's central server 140 which authenticates the customer 160. The bank's central server 140 can then generate an authentication token which is accepted by the third party business, thus allowing the customer 160 to execute various transactions with the third party business and the financial institution while the authentication token is active without further authentication.

The financial institution can thus provide a more general service of authenticating customers and generating authentication tokens that can be used with business partners of the financial institution. In addition, the authentication token can be linked to customer preference information such as the customer's preferred payment mechanism (e.g., Bank/Airline VISA card) so that such payment card information no longer needs to be stored with the merchant. The financial institution facilitates payments by the customer 160 by linking or associating the authentication token with the customer's preferred payment mechanism. When the customer purchases goods or services from the merchant, the method of payment has already been established with the third party merchant and the financial institution.

The financial institution can also query the customer as to whether the customer would like to transmit certain financial information to each third party merchant, such as customer preferences and transaction history with the merchant. If the customer elects to do so, the financial institution can transmit the customer selected information with the authentication token. The additional financial information can benefit the customer by allowing the merchant to provide customized offers and services that fit the customer's preferences and transaction history.

Various embodiments of the system and method described herein can significantly improve the customer's experience at a branch bank and/or third party merchant by facilitating and expediting the authentication process, educating the bank or merchant personnel as to the customer' background, inquiries and objectives, and quickly finding bank or merchant personnel with the necessary experience to assist the customer.

Although the foregoing description has focused primarily on a financial institution assembling relevant data sets, processing the data, and sending the relevant data at appropriate times to personnel within a financial institution, the system may be operated and maintained by other types of commercial entities who may configure the system to provide similar advantages to their customers.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown in FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of mobile devices (including, for example, cell phone, tablet and wearable personal computing devices) 162, 164 and personal computing devices (e.g., tablet, laptop, desktop computers) 125, 127 are shown in FIG. 1, exemplary embodiments of the invention may utilize other types of communication devices whereby a user may interact with a network that transmits and delivers data and information used by the various systems and methods described herein. The mobile device and personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The mobile devices 162, 164 and personal computing devices 125, 127 may include various connections such as a cell phone connection, WiFi connection, Bluetooth connection, satellite network connection, and/or near field communication (NFC) connection, for example.

As described above, FIG. 1 includes a number of servers 122, 140 and user communication devices 162, 164, 125, 127 each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, app, or software.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 162, 164 or personal computing device 125, 127. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. An automated computer implemented method for implementing a one-time user authentication with a plurality of systems associated with a financial institution, wherein the method is executed by a programmed computer processor in communication with a communication device associated with a user, the method comprising the steps of:

capturing, by an automated teller machine (ATM) configured to dispense cash and being equipped with a camera, a facial image of the user;

generating a unique authentication token to represent an authenticated active session between the communication device associated with the user and the ATM of the financial institution after authentication of the user has been performed, the authentication with the ATM being based on at least one item of identifying information associated with the user, and the unique authentication token comprising a unique customer ID coupled with one or more keys representing a time of creation, a location of a specific branch of the financial institution and an identification of the communication device associated with the user, wherein the at least one item of identifying information includes the facial image of the user captured by the ATM;

identifying another system of the financial institution requiring authenticated access, wherein the identifying is based on a selection made by one of the user through a user interface of the communication device and a teller through a computing device associated with the financial institution;

transferring the unique authentication token from the ATM to the other system while maintaining the authenticated active session such that the authenticated active session established at the ATM is maintained at the other system, wherein the other system is selected from one or more options presented, with an associated color indicator for each option to indicate availability, at one of the user interface of the communication device and the computing device associated with the teller; and updating configuration of the other system to waive authentication process at the other system for the user by continuing the authenticated active session that was established at the ATM between the communication device of the user at the other system, wherein authentication with the other system is based on the unique authentication code received from the ATM.

2. The computer implemented method of claim 1, wherein the step of authenticating with the ATM based on the at least one item of the identifying information further comprises:

sending an authentication code to the communication device associated with the user; and receiving, at the financial institution, the authentication code using a transceiver.

3. The computer implemented method of claim 2, wherein the communication device transmits the authentication code to the transceiver via at least on one of Bluetooth Low Energy (BLE), near field communication (NFC), and WiFi transmission.

4. The computer implemented method of claim 1, wherein the step of authenticating with the ATM based on the at least one item of identifying information further comprises:

comparing the facial image captured by the ATM with a digitally stored image of the user's face; and determining whether the facial image captured by the ATM matches the stored image.

5. The computer implemented method of claim 1, wherein the other system is associated with a third party merchant.

6. The computer implemented method of claim 5, further comprising the steps of:

establishing a default payment mechanism with the third party merchant, the default payment mechanism comprising a payment card associated with the financial institution held by the user; and using the payment card, by the user, for purchases at the third party merchant.

7. The computer implemented method of claim 5, further comprising the steps of:

sending a query to the communication device associated with the user, the query asking the user whether he or she would like to send one or more user preferences or transaction history to the third party merchant; and upon receiving a positive response to the query, transmitting the user preferences and transaction history to the third party merchant.

8. The computer implemented method of claim 5, wherein authentication with the ATM associated with the financial institution is performed through a website of the third party merchant that is visited by the user; and sending, by the financial institution, the unique authentication token to the other system associated with the third party merchant.

9. The computer implemented method of claim 5, wherein authentication with the ATM associated with the financial institution is performed through a website of the financial institution that is visited by the user; and transferring, by the financial institution, the unique authentication token to one or more systems associated with one or more third party merchants, wherein the transferring is based on a response from the user indicating a desire to interact with the one or more third party merchants.

10. The computer implemented method of claim 1, wherein one or more account and transaction information associated with the user is linked to the unique authentication token and transferred to the other system along with the unique authentication token.

11. The computer implemented method of claim 1, wherein the unique authentication token is configured to remain active only while the user remains at a target physical location.

* * * * *